United States Patent

[11] 3,622,686

[72] Inventors Edward A. Neirinck
Mt. Clemens, Mich.;
Ralph L. Johnson, Cape Coral, Fla.
[21] Appl. No. 36,654
[22] Filed May 12, 1970
[45] Patented Nov. 23, 1971
[73] Assignee General Motors Corporation
Detroit, Mich.

[54] CONDUIT FOR HOUSING A PLURALITY OF ELECTRIC WIRES AND ASSOCIATED CONNECTORS
4 Claims, 3 Drawing Figs.

[52] U.S. Cl. .................................................. 174/97,
174/48, 174/72 A
[51] Int. Cl. .................................................. H02g 3/04
[50] Field of Search .................................................. 174/48, 49,
68 C, 70 C, 72 A, 72 C, 95, 97; 317/122; 179/98;
138/111, 115, 116

[56] References Cited
UNITED STATES PATENTS
3,347,392  10/1967  Gonyea .......................  174/97 X
FOREIGN PATENTS
230,536  1/1911  Germany .......................  174/97
1,108,287  6/1961  Germany .......................  174/97
135,210  10/1961  U.S.S.R. .......................  174/97

Primary Examiner—Laramie E. Askin
Attorneys—Charles R. Engle and Frank J. Soucek ABSTRACT: A casement and protective device for the wires employed in a motor vehicle which device includes at least two compartments. One of the compartments being adapted to contain all of the original wiring and having openings therein for the removal of selected wires, and a second compartment integral with the first compartment and having means therein for receiving the removed or replaced wires, the entire device being made of electrically nonconductive material whereby shorting out of the wires is minimized.

PATENTED NOV 23 1971 3,622,686

INVENTORS.
Edward A. Neirinck, &
BY Ralph L. Johnson
F. J. Soucek
ATTORNEY

CONDUIT FOR HOUSING A PLURALITY OF ELECTRIC WIRES AND ASSOCIATED CONNECTORS

The present invention is generally directed to a protective casement for wires and more specifically directed to a casement for the wires or wire harness employed in motor vehicles.

Motor vehicles employ many feet of wiring for front and rear lights, turn signals, power windows and other battery operated devices. All of the wiring is connected to the vehicle battery through a harness or bundle of wires. The harness is generally connected behind or under the dash panel of the vehicle by means of clamps.

It is an object of the present invention to provide means for encasing the harness in a protective, nonconductive container secured to the dash panel or other part of a motor vehicle.

A further object is to provide a casement for the harness wherein openings are provided in the casement for removing selected wires for testing prior to connecting the wires to remote electrical accessories.

A further object is to provide means integral with said casement for receiving the wires to be tested.

The above and other objects will be more apparent when the following specification is read in conjunction with the accompanying drawing wherein.

Figure 1:
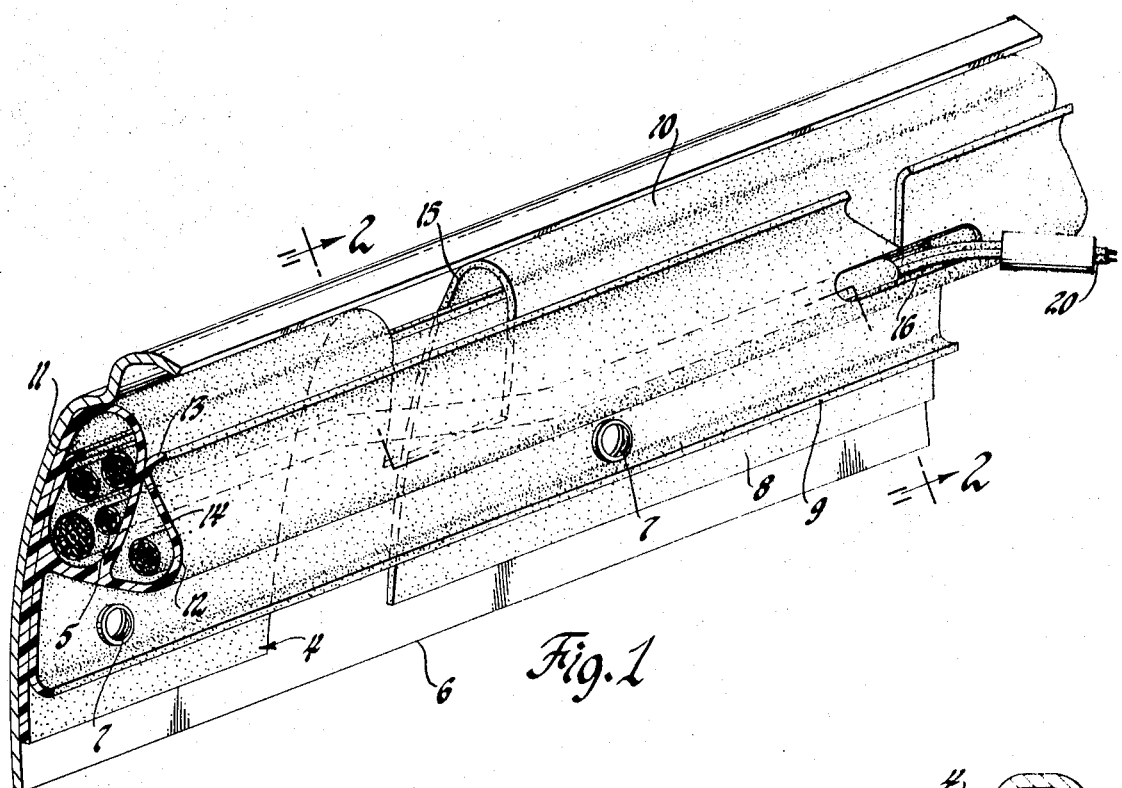
FIG. 1 is a perspective view of the harness casement in accordance with the present invention.

Referring now to the figures a casement 4 for a wire harness or plurality of wires 5 is secured to a panel 6 of a motor vehicle by screws or rivets 7.

The casement 4 includes a pair of inner walls 8 and 9 and an outer wall 10 formed integral with the inner walls. The inner walls 8 and 9 and the outer wall form a first wire receiving compartment 11.

A rib 12 is formed integrally with the outer wall 10 and extends upwardly and inwardly therefrom. The rib 12 is provided with a free edge 13 that engages the outer wall 10 and defines therewith a second chamber 14. The outer wall 10 is provided with at least one opening 15 and the rib 12 is provided with at least one opening 16 through which one or more of the wires 5 may pass.

Figures 2, 3:
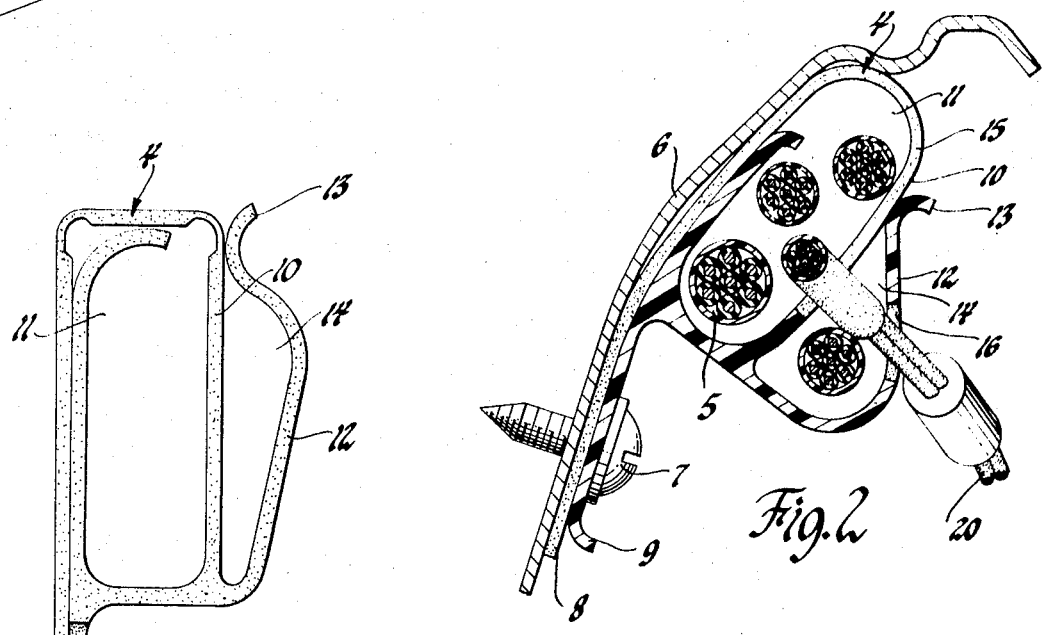
FIG. 2 is a sectional view taken along the lines 2—2 of FIG. 1.
FIG. 3 is an end view of a further embodiment of the present invention.

As shown in the embodiment illustrated in FIG. 3, the inner wall 8 is provided with a lip 17 to receive the free edge 18 of the inner wall 9 and thereby secure the inner walls together.

Compartment 14 stores a plurality of wires 20 of various lengths, each or several of which extend through one of the several openings 15 in compartment 11 to a nearby V-shaped slot in rib 12. Each of the wires 20 thus extends about 6 inches from its nesting slot to permit testing of the system without occasioning probable damage to the length of wire in storage. After installation and testing, wires 20 are removed from compartment 14 and connected to remote electrical accessories.

While preferred embodiments of the invention have been disclosed it will be obvious to one skilled in the art that minor changes can be made without departing from the spirit or scope of the invention as defined by the following claims.

What is claimed is:

1. A holder for a plurality of wires comprising a first body having inner walls and an outer wall adapted to encompass said wires, said inner walls having free edges adapted to be secured to a supporting structure, a second body integral with said first body and comprising said outer wall and a further wall extending outwardly and upwardly from the base of said outer wall with the upper edge of said further wall engaging the side of said outer wall, and means defining longitudinally spaced openings in said outer wall and said further wall for the removal of preselected wires from said bodies.

2. A holder for a plurality of wires as defined by claim 1 wherein said walls are formed of electrically nonconductive material.

3. A holder for a plurality of wires as defined by claim 1 wherein said second body has a cross-sectional area that is less than the cross-sectional area of said first body.

4. A casement for a plurality of wires comprising a pair of inner walls adapted to be secured to a supporting structure, an outer wall integral with said inner walls and defining therewith a first chamber for receiving said wires, a rib integral with said outer wall and extending outwardly therefrom, said rib further extending upwardly and inwardly and having a free edge engaging said outer wall to define with said outer wall a second chamber for receiving wires, and one of said inner walls being provided with a lip to receive a free edge of the other of said inner walls.

* * * * *